Aug. 16, 1966  D. B. CARLSON  3,266,609
ROTATING ELBOW CONSTRUCTION FOR DISCHARGE SPOUTS AND THE LIKE
Filed April 5, 1965

Dwight B. Carlson
By F. David Rubutton, Atty.

United States Patent Office 3,266,609
Patented August 16, 1966

1

3,266,609
ROTATING ELBOW CONSTRUCTION FOR DISCHARGE SPOUTS AND THE LIKE
Dwight B. Carlson, Rapids City, Ill., assignor to International Harvester Company, Chicago, Ill., a corporation of New Jersey
Filed Apr. 5, 1965, Ser. No. 445,620
5 Claims. (Cl. 193—16)

The instant invention relates to solids conveyors and the like. Particularly it relates to rotatable discharge apparatus for solids conveyors and the like. Specifically it relates to an elbow construction or connector by reason of which a discharge duct is rotatable with respect to the discharge end of a relatively stationary conveyor housing adapted for translocation therethrough of solids such as grain and the like.

While the instant invention is applicable to solids other than grain material, it was developed in connection with problems relating to the handling of grain during harvesting. Accordingly, it is illustrated and discussed in connection with the handling of grain. During harvesting, a grain crop, in one form or another, is conventionally transferred from a mobile harvesting machine to a mobile grain container which accompanies the harvesting machine. A mobile grain container, once filled, is replaced with an empty container.

In conventional practice, a grain product to be recovered is generally elevated in a harvester by means which may include a clean grain elevator from the discharge end of which grain may be delivered to a grain wagon or the like which accompanies the harvester. The discharge end of the housing of such clean grain elevator is aligned with a chute or duct into which clean grain is fed for delivery into such accompanying grain wagon. Because the grain will not always be fed to the same position in a wagon, in order to distribute the load, and because conditions make it impractical for such wagon and clean grain elevator from housing to remain in continuous predetermined alignment as they move during a harvesting process, means are required to connect the discharge end of the grain elevator housing with the chute which feeds the discharged grain into the grain wagon.

A rotatable connection is that which is most practical and versatile in the handling of the solids contemplated. To that end, connection means or a connector is conventionally employed which journals the discharge end of an elevator housing with respect to a delivery chute or duct leading to a grain wagon whereby such delivery chute may be rotated with respect to the delivery end of such elevator housing. A conventional journal contemplates bearing parts which may include a rib or annulus on one of the parts which rides in a groove or annular track provided on the other part, whereby the parts may be relatively rotated.

Harsh conditions which exist during normal usage of harvesting machines and grain handling mechanisms for removal of grain from such harvesting machines frequently result in blows or the like against bearing surfaces which are responsible for journalling connection between grain elevator housings and associated discharge chutes. Resultant denting of surfaces which of mechanical necessity must be adjacent each other occurs, thereby, frequently destroying the bearing surface relationships to preclude or limit relative rotation of parts intended and required to be rotatable with respect to each other, as aforesaid.

Accordingly, it is desirable that a connection for permitting relative rotation of a part, such as the discharge end of a grain elevator housing, and a delivery chute, or the like, for delivery of grain to a grain wagon and the like, be provided in which there is sufficient spacing between overlapping parts to permit relative rotation thereof notwithstanding surface faults, such as dents and the like, which may occur in the ordinary course of usage.

Accordingly, it is an object of the instant invention to provide an improved conveyor for transporting from one position to another solids such as grain and the like.

A further object of the instant invention is the provision in a solids handling apparatus of an improved connector permitting relative rotation of a relatively fixed housing or casing and a relatively rotatable delivery duct and the like.

A still further object of the instant invention is the provision of a grain transferring means and the like which includes a relatively fixed delivery portion and means for suspending a rotatable connector about said delivery portion and a solids delivery duct secured to said rotatable connector, whereby the duct may rotate about the delivery end of the relatively fixed housing.

A yet further object of the instant invention is the provision of a telescopic connector rotatably mounted in a delivery chute and which has a portion extending about the delivery end of a relatively fixed housing member with means for rotatably holding the connector in non-bearing relationship with the delivery end portion of the relatively fixed housing member.

Another object of the instant invention is the provision in the connector of overlapping wall extensions which are spaced from and disposed about the delivery end portion of the relatively fixed housing member to provide a continuous enclosed path between such end of the housing member and the delivery duct, the rotation of which will be possible notwithstanding dents and other irregularities occurring in overlapping surfaces by reason of the spacing thereof from each other.

A further object of the instant invention is the provision of a grain transferring mechanism which includes a grain elevator housing which supports a hanger suspending a rotatable connector spaced from said elevator housing and supporting a grain delivery chute which is telescopically connected to the connector by means of which said grain delivery chute is rotatable about the delivery end portion of the grain elevator housing from which said connector provides an enclosed course to said chute.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

Figure 2:
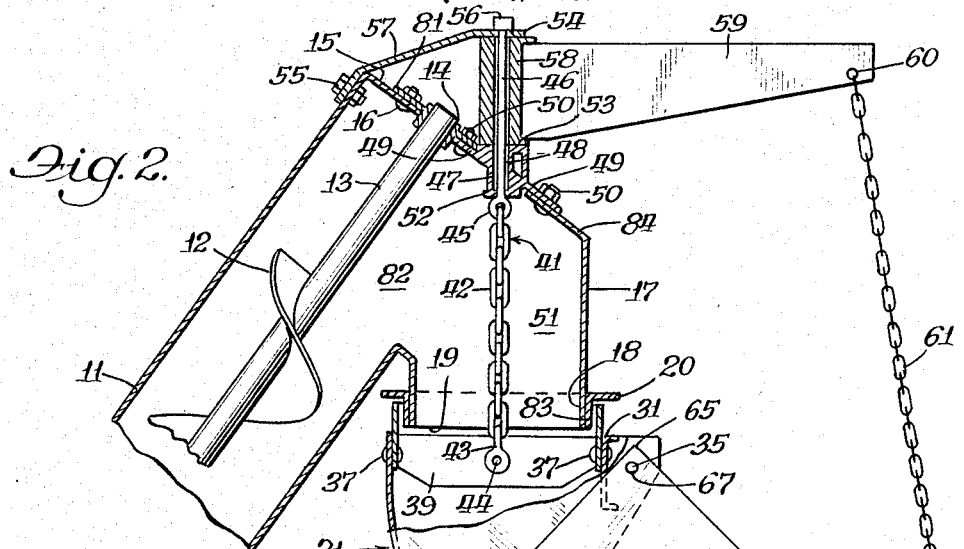
FIG. 2 is a longitudinal view of said embodiment, part being shown in elevation and part being shown in section for the purpose of illustration.
Figure 1:
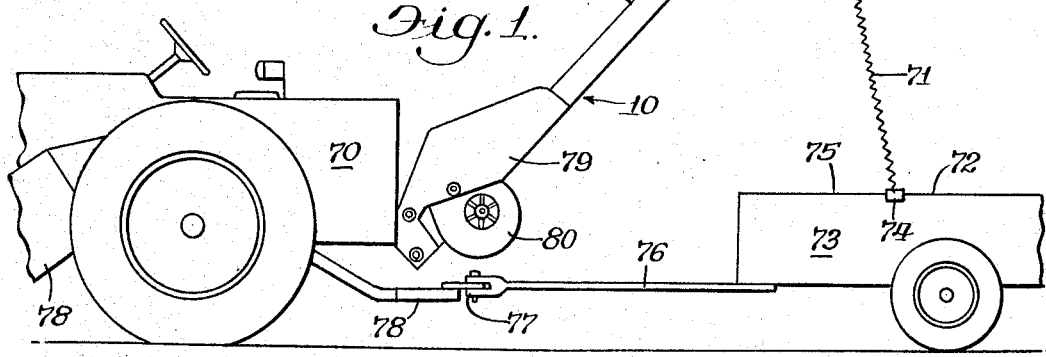
FIG. 1 is a side elevation of an embodiment of the instant invention illustrating the same mounted in grain transferring position with respect to a harvester-tractor and a grain wagon.

Referring now more particularly to the drawings, there is seen in FIG. 1 what may be referred to as a wagon elevator 10 which comprises an elongated upwardly and angularly disposed tube-like housing 11 in the chamber 82 of which there is rotatably mounted an elongated conveyor screw or auger 12 which extends longitudinally of housing 11. The upper end portion of the shaft 13 of said auger 12 is journalled in a bearing ring 14, or the like, a portion of an integral flange 81 of which is secured to the integral apertured top or cover 15 of housing 11 by means of conventional fasteners such as bolts and nut combinations 16, as illustrated in FIG. 2. The auger 12 is adapted to deliver grain and the like upwardly in auger chamber 82 to a chamber 51 defined by a downspout 17. Downspout 17 comprises a downwardly extending offset extension of the housing 11 and at its lower end portion 18 defines a delivery opening 19 through which grain and the like delivered by the auger 12 to chamber 51 will drop downwardly from the housing 11.

The lower end portion 18 of the downspout 17 may be circular in cross section, and a continuous band or ring 83 is rigidly secured to the outer surface of such portion 18 by means such as welding or the like. The band 83 has a continuous upper annular radially extending flange 20 which provides an abutment or stop which is adapted to limit the upward movement of a connector generally designated by numeral 21.

Connector 21 is a rotatable component which also may be variously referred to as a shoe or elbow and which rotatably connects a grain delivery chute or duct generally designated by the numeral 22 to downspout 17, in a manner which will become hereinafter apparent. To that end, the connector 21 may be fabricated from a suitable metal and comprise a pair of substantially parallel side plates 23 and 24 which are substantially in the shape of a triangle with one leg or side of each of said plates 23 and 24 being curved. A base or lower plate 26, the sides of which are integral with or suitably secured to the opposed curved sides 25 of the plates 23 and 24, respectively, forms a closure between the plates 23 and 24, and at its upper end defines with upper legs or edges 27 of said plates 23 and 24 an upper opening 28, and its forward or lower end defines with forward legs or edges 29 of said plates 23 and 24 a forward opening 30.

A rigid tie 31 extends transversely of said plates 23 and 24 and is connected thereto by means of a pair of opposed apertured integral ears 32, which are rigidly secured by any suitable means, such as welding or the like, to the inner surfaces of the plates 23 and 24 at the corners formed by legs 27 and 29, as illustrated in the drawings. The apertures 33 in said ears 32 are aligned with apertures 34 in said plates 23 and 24, and said apertures 33 and 34 accommodate a transversely extending pivot pin 35 which is illustrated in FIG. 2 and which is disposed in the corners formed by the junction of the edges 27 and 29 and the purpose of which will be hereinafter described.

Figure 3:
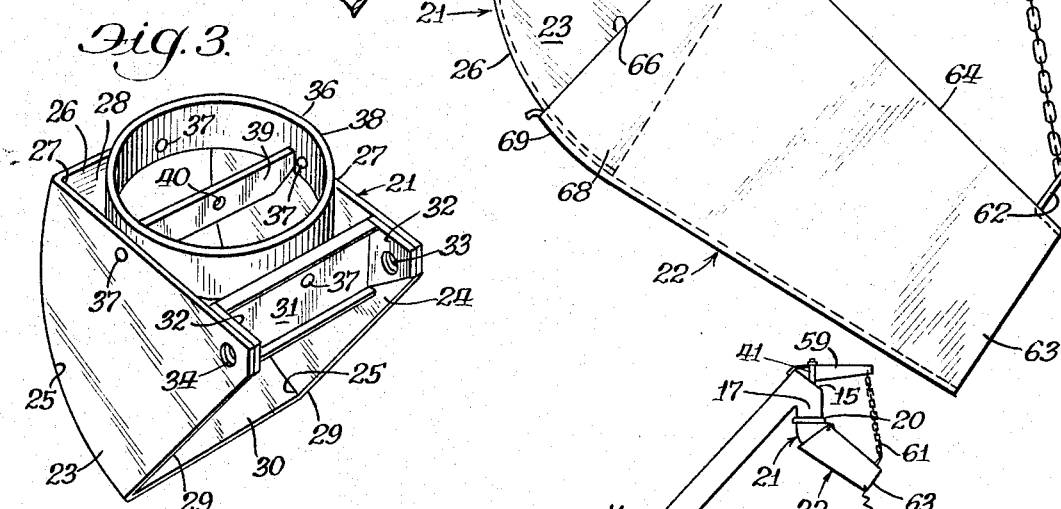
FIG. 3 is a perspective view of the rotatable connector comprising said embodiment.

The transversely extending tie 31 defines the forward limit of the opening 28 and the upper limit of the opening 30, as illustrated in FIG. 3 of the drawings. A collar or ring 36 is secured in the opening 28 by means which may include fasteners such as rivets 37 which secure the ring 36 to plates 23 and 24 and to the tie 37 and the base 26. The ring or collar 36 has an upper integral annular extension or portion 38 which extends upwardly from opening 28 beyond the edges 27 of the plates 23 and 24.

The upper extension 38, when in operable position, is disposed about the ring 83. The diameter of the extension 38 is greater than the diameter of the ring 83, whereby when said ring 83 is centered within the collar extension 38, said collar extension will be spaced from the ring 83. The spacing is adequate to preclude interference with rotational movement of collar extension 38 about ring 83 resulting from dents or damage irregularity occurring during ordinary usage of the device.

To the end that the extension 38 is rotatable about the ring 83 and retains its overlapping spacing therefrom, a hanger strap 39 which is spaced below the top of extension 38 is disposed diametrically within the ring 36 and has its opposite ends rigidly secured to the inner surface of the ring 36 by any suitable means, such as welding or the like. The hanger strap 39 is provided with an aperture 40 which is disposed substantially midway between its ends, whereby the aperture 40 is disposed centrally with respect to the collar 36. As clearly illustrated in FIG. 2, a vertical hanger mechanism generally designated as 41 is operably connected to the hanger strap 39 and suspends the connector 21 in a manner that will dispose the extension 38 about the ring 83.

For that purpose, the hanger mechanism 41 may include a vertically depending chain 42 on the lower end portion of which an eye fastener 43 is secured. By means including a pin 44 which extends through the eye of the fastener 43 and the aperture 40 of hanger strap 39, the connector 21 is suspended from the lower end portion of the hanger 41.

The hanger chain 42 is disposed centrally with respect to the downspout 17. That is to say, the disposition of the hanger chain 42 is such that it extends longitudinally of said downspout 17 passing through the center of chamber 51 and the downwardly facing opening 19. Thereby, the centered spaced relationship of the collar extension 38 about the ring 83 can be maintained.

To retain the hanger chain 42 is properly centered position, the upper end thereof is secured in an eye or fasteners 45 which depends or is secured on the lower end portion of a vertical hanger pin or rod 46 which is in vertical axial alignment with chain 42. The rod 46 is rotatably disposed within a tube-like or elongated bore providing component 47, the bore 48 in which extends vertically. Component 47 has flange means 49 which are angularly disposed adjacent a portion 84 of housing cover 15 and flange 81 to which flange means 49 are rigidly secured by means of conventional fasteners 50. Thereby, component 47 is disposed above and below cover 15 with its lowermost portion extending into the chamber 51.

A lower integral flange 52 carried on said component 47 limits the upward movement of the eye fastener 45 and simultaneously provides a bearing therefor as it rotates. The upper end portion of component 47 provides a bearing flat 53 which is disposed above cap 15 normal to bore 48. The upper portion of the rod 46 extends upwardly from bore 48 through flat 53 and through the bearing end portion 54 of an elongated bearing carrier or arm 57. A boss, such as a nut 56, mounted on the upper threaded end portion of said rod 46 bears on the bearing portion 54 and may be tightened thereon only to the extent that no slack develops in chain 42 but without limiting the rotation of the rod 46. At illustrated in FIG. 2, apertures in bearing 54 and flange 52 are in vertical alignment, and bearing 54 is parallel to and superposed with respect to flat 53 with its arm or carrier 57 being rigidly secured to the housing 11 by means of a conventional fastener 55.

A vertically extending hub 58 is journalled between bearing 54 and flat 53 which are disposed against the opposite end faces of said hub. A medial portion of rod 46 extends vertically through said hub and provides thereby a vertical axis of rotation for an elongated arm 59 which extends normally outwardly from said hub 58 with which said arm 59 is integral or to which it is rigidly secured. The outer end portion of arm 59 has an aperture or eye 60 which is disposed outwardly from rod 46 a distance preferably substantially greater than the radius of the collar 36.

The upper end portion of a second hanger, which in the embodiment illustrated comprises a chain 61, is secured in the aperture 60. At its lower end portion, the chain 61 is connected, by means of a fastener or connector 62 which may be of any conventional design, to an outer deliver end portion 63 of chute or delivery duct 22 to suspend said chute 22, as illustrated in FIGS. 1 and 2.

The chute or duct 22 in the embodiment illustrated has a pair of upper edges 64, only one of which is seen in the drawings, and which define a pair of corners 65 with the rear U-shaped edge 66 of said chute 22. At the corners 65, the chute 22 is provided with a pair of transversely aligned apertures 67 through which the pin 35 extends. In the normal operable assembly of the chute 22, the connector, shoe or elbow 21 is telescopically inserted with its lower opening 30 disposed within the upper end portion 68 of the chute 22, thereby positioning the base 26 and the base 69 in overlapping positions with the base 26 disposed along the inner surface of the base 69, as illustrated in FIG. 2. Pin 35 provides a pivotal connection for the upper end of the chute 22 and the forward end portion of the connector 21, being disposed in aligned apertures 33, 34 and 65.

Having thus described the details of construction, the following brief description of the manner of operation of the device will facilitate further appreciation of its characteristics. The delivery end portion 63 of the chute 22 may be connected by a pair of expansion springs 71 to opposite side rails 72, respectively, of a clean grain receiving wagon 73 by means of a pair of adjustable clamps 74 which may be of any suitable construction. The purpose of the connection between the end portion 63 and the wagon 73 is to keep the chute disposed over the wagon opening 75 into which grain is adapted to be continuously delivered by the chute 22.

The wagon 73 conventionally may have a forwardly extending arm 76 the front end portion of which is coupled as at 77 to the rear end portion of a frame extension 78 of a power driven farm tractor 70 behind which said wagon 73 is pulled, as illustrated in FIG. 1. A grain harvesting mechanism 78 which is mounted on the forward end portion of the tractor 70 together with divers conventional means (not shown) is adapted to deliver harvested grain to a lower enlarged housing 79 about the bottom of elevator 10 and from which debris will be blown by a blower 80 prior to elevation of grain to the top of housing 11. Because the terrain on which wagon 73 is disposed and that on which the tractor 70 is disposed at any given time may be of different levels, the springs 71 are provided to compensate for variations, holding the chute 63 in a highly efficient manner with respect to the wagon opening 75.

By reason of the telescopic connection of the connector 21 and the chute 22, said chute is free to rock about the axis of rotation provided by the pin 35 outwardly and inwardly to shorten or lengthen said chute. Accordingly, its inclination can be changed by changing the position of clamps 74 to cause delivery from end 63 to various positions longitudinally of the longitudinal axis of wagon 73 which moves in the general path of movement of tractor 70.

Additionally, torque transmitted through the springs 71 may require the chute 22 to rotate to follow wagon 73 about a curve or when rocking from side to side on uneven terrain. To that end, such torque will cause the chute 22 to rotate about the substantially vertical axis provided by rod 46 and defined by bore 48 by reason of the suspension of the chute 22 from the rotating arm 59 by the hanger or chain 61.

Furthermore, during all normal movement, a continuous grain transmission duct from housing 11 to chute 22 is provided because of the fixed length of the hanger 41. Therefore, the connector 21 cannot separate vertically from the ring 83; that is, the collar extension 38 and the ring 83 must always be in overlapping positions. Additionally, by reason of the diametric disposition of the hanger strap 39 and the central position therein at which it is connected to hanger 41 which suspends said connector 21 through the center of ring 83, a spaced relationship calculated to be concentric between the collar extension 38 and the ring 83 will be maintained so that relative rotation of the chute and the conveyor downspout will be facilitated without interference of bearing surfaces. Moreover, upward movement of the connector 21 is limited by the flange 20 which forms an abutment for the upper edge of the collar extension 38, as illustrated in FIG. 2.

From the foregoing, it will be appreciated that as grain is carried upwardly in the housing 11 it is spilled into the chamber 51 and then drops through downspout opening 19 through the connector shoe or elbow 21 to fall against the base 69 of the chute 22 from which it will be delivered through the opening 75 into the wagon 73. It is also appreciated that in normal operation jamming or retention of rotatable parts of the grain transferring members is precluded by the spacing of the adjacent rotatable members and the elimination of bearing surfaces and journals.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A solids conveyor adapted for use in translocation of grain and the like comprising:
   a solid transfer housing defining a delivery downspout having a delivery opening;
   a rotatable connector having intake and discharge openings and disposed in receiving relationship below and spaced outwardly above said downspout;
   means defining a vertical axis of rotation for said connector including a vertical rod, said rod having a lower end portion attached to said connector and an upper end portion forming a journal;
   a downwardly opening delivery duct having an inner receiving end portion mounted on said connector about its discharge opening and disposed in receiving alignment therewith;
   and means defining a hanger rotatable about said journal for suspending said duct, whereby when torque is applied to said duct it will rotate with said connector said hanger comprising an elongated arm rotatably mounted outwardly of said housing; a suspender having an upper end portion connected to said arm and a lower end portion connected to said duct.

2. The device defined in claim 1 further characterized by a bearing carrying arm secured to said housing and having an apertured end portion; a bearing mounted in said housing, said end portion and said bearing in superposed relationship, said rod disposed in said end portion and said bearing, said elongated arm disposed therebetween.

3. A solids conveyor adapted for use in translocation of grain and the like and comprising
   a solids transfer housing defining a spout having a lower end portion,
      said lower end portion defining a downwardly facing discharge opening;
   a boss mounted on and extending outwardly from said lower end portion;
   a downwardly opening delivery duct having an inner end portion defining an upper opening disposed in receiving alignment with said discharge opening,
      said duct having a lower end portion defining a delivery opening;
   a connector having a receiving opening and outlet opening and pivotally connected to said inner end portion and having a curved base telescopically mounted in said upper opening;
   a collar having a bottom portion secured to said connector and disposed within the receiving opening,
      said collar having a top portion extending upwardly from said connector toward said boss and disposed in spaced apart and overlapping relationship with said lower end portion;
   a hanger connector diametrically disposed in and having opposite ends secured to said bottom portion;
   a vertical hanger extending through the center of said spout and having a lower end portion secured centrally of said opposite ends, said hanger extending through said housing and having extending upwardly therefrom an upper end portion, and an arm disposed outwardly of said housing normally to said rod and having an inner end portion journalled on the upper end portion of said hanger and an outer end portion from which said duct is suspended.

4. A solids conveyor adapted for use in translocation of grain and the like and comprising
- a solids transfer housing defining a delivery downspout;
- a connector having a delivery opening and a receiving opening and rotatable about said downspout in outwardly spaced and overlapping relationship therewith;
- a duct having an upper intake portion pivotably connected to said connector about said deliver opening and defining an intake opening,
  - said duct having a lower end portion defining a discharge outlet,
  - said duct rockable in a vertical plane;
- a vertical hanger disposed centrally of said downspout,
  - said hanger having a lower end portion extending below said downspout and an upper end portion disposed in said housing and extending upwardly therefrom,
  - the lower end portion of said hanger secured centrally of said connector;
- a bearing member secured in superposed relationship to said housing,
  - the upper end portion of said hanger journalled in said bearing member;
- an elongated arm having an inner end portion journalled on said hanger between said bearing and said housing,
  - said arm having an outer end portion disposed above said duct, and
- a suspender hanging said duct from said arm, whereby upon appliction of torque to the duct it will rotate at all angles of its vertical inclination with said connector about said downspout.

5. A solids conveyor adapted for use in translocation of grain and the like and comprising
- a solid transfer housing defining a delivery downspout;
- a connector having a delivery opening and a receiving opening and rotatable about said downspout in outwardly spaced and overlapping relationship therewith;
- a duct having an upper intake portion pivotably connected to said connector about said delivery opening and defining an intake opening,
  - said duct having a lower end portion defining a discharge outlet,
  - said duct rockable in a vertical plane;
- a vertical hanger disposed centrally of said downspout,
  - said hanger having a lower end portion extending below said downspout and an upper end portion disposed in said housing and extending upwardly therefrom,
  - the lower end portion of said hanger secured centrally of said connector;
- a bearing member secured in superposed relationship to said housing;
- a hanger journalling member mounted in said housing and vertically spaced from said bearing member,
  - the upper end portion of said hanger journalled in said bearing member and said journalling member;
- an elongated arm having an inner end portion journalled on said hanger between said bearing and said journalling member,
  - said arm having an outer end portion disposed above said duct, and
- a suspender hanging said duct from said arm, whereby upon application of torque to the duct it will rotate at all angles of its vertical inclination with said connector about said downspout.

References Cited by the Examiner

UNITED STATES PATENTS

| | | | |
|---|---|---|---|
| 878,721 | 2/1908 | Gilman | 193—16 |
| 948,746 | 2/1910 | Smith | 193—16 |
| 1,047,866 | 12/1912 | Weller | 193—16 |
| 1,230,820 | 6/1917 | Levalley et al. | 193—2 X |
| 2,652,288 | 9/1953 | Sands | 193—16 X |

EVON C. BLUNK, *Primary Examiner.*

A. L. LEVINE, *Assistant Examiner.*